Aug. 20, 1940.  B. H. WEEKLEY  2,212,358
APPARATUS FOR FEEDING BATCH TO GLASS FURNACES
Filed April 16, 1938
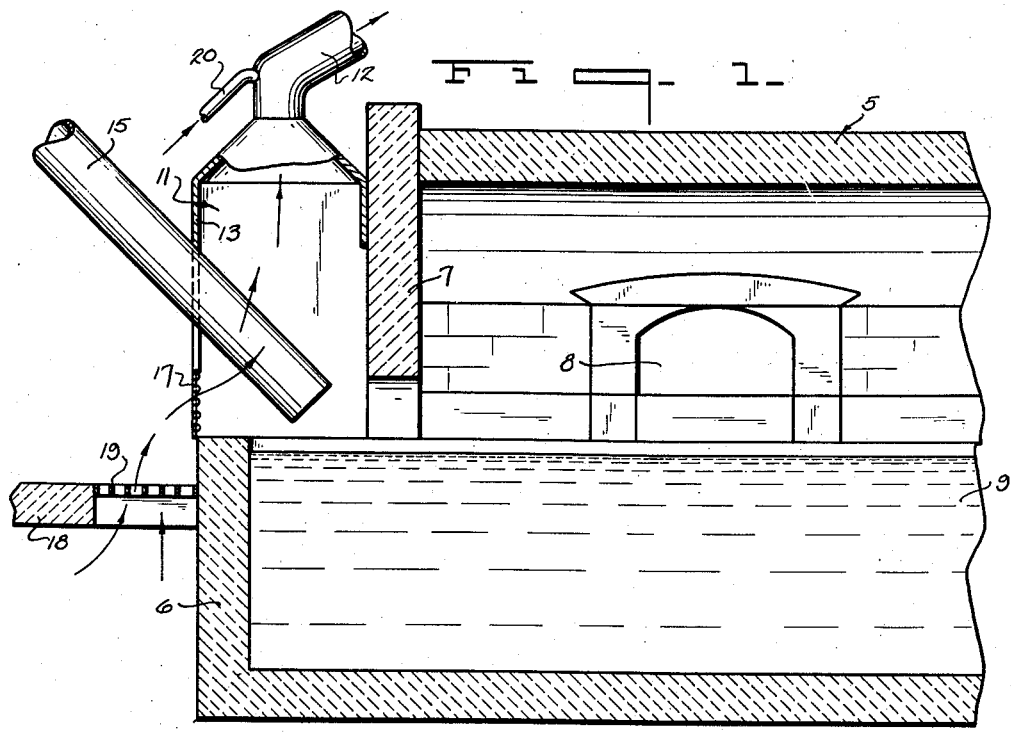
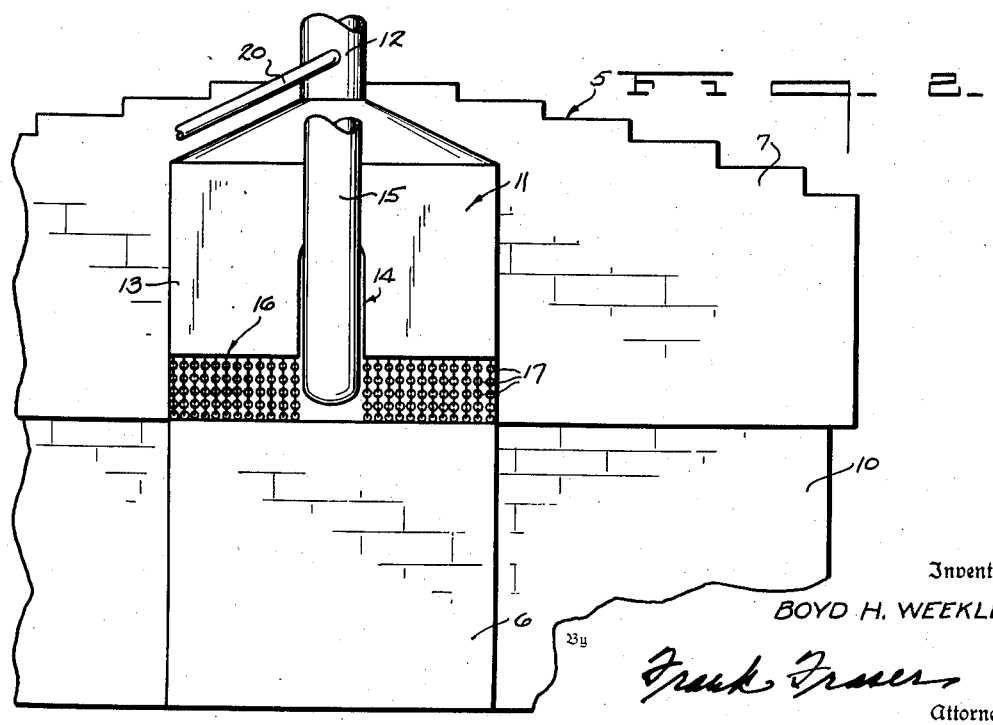
Inventor
BOYD H. WEEKLEY.
By Frank Fraser
Attorney Patented Aug. 20, 1940

2,212,358

UNITED STATES PATENT OFFICE 2,212,358

APPARATUS FOR FEEDING BATCH TO GLASS FURNACES

Boyd H. Weekley, Shreveport, La., assignor to Libbey-Owens-Ford Glass Company, Toledo, Ohio, a corporation of Ohio Application April 16, 1938, Serial No. 202,366

9 Claims. (Cl. 49—54)

The present invention relates to improvements in apparatus for feeding glass batch ingredients to a glass melting furnace.

It is the customary practice to supply glass batch ingredients to glass melting furnaces by suitably mixing the raw ingredients and then feeding them into the furnace in a loose pile. Due to the nature of the ingredients, there is considerable loose dust present which is permitted to fly around in the furnace and which results in a more rapid deterioration thereof than would take place if such dust were eliminated. For instance, some of the fluxing elements are blown against the cap and walls of the furnace and also down into the checkerworks of the regenerative heating means. This, coupled with the intense heat, causes a relatively rapid fluxing or deterioration of the tank itself and thus considerably lessens the life thereof. Further, the loose dust collecting in the checkerworks of the regenerators results in the clogging thereof which hinders the passage of air through the checker chambers so that obviously the efficiency of the regenerators is lowered.

It is the aim of this invention to effect the removal of all or at least a major portion of the loose dust from the glass batch as it is delivered into the furnace and before it enters the melting tank proper, thereby reducing to a minimum the clogging of the checkerworks as well as increasing the life of the furnace as a whole by minimizing the fluxing or deterioration of the tank itself.

Another object of the invention is the provision of improved apparatus associated with the charging end of the furnace for initially receiving the raw glass batch ingredients and for carrying away the loose dust present before the batch is delivered into the melting tank proper.

Other objects and advantages of the invention will become more apparent during the course of the following description when taken in connection with the accompanying drawing.

In the drawing wherein like numerals are employed to designate like parts throughout the same:

Fig. 1 is a vertical longitudinal sectional view through the melting end of a glass furnace constructed in accordance with the invention; and Fig. 2 is an end view of said furnace.

With reference to the drawing, 5 designates the melting end or tank of a conventional type of glass melting furnace, said melting tank being preferably of the usual substantially rectangular form and provided at one end thereof with a reduced extension 6, commonly termed the doghouse, for initially receiving the raw glass batch ingredients. The doghouse 6 is in communication with the melting tank 5 and the batch ingredients are delivered from the former into the latter by passing them beneath the upper back wall 7 of the furnace. The melting heat is supplied through suitable regenerators, indicated at 8, to reduce the raw batch ingredients to molten glass 9. The doghouse 6 extends outwardly beyond the lower back wall 10 of the furnace and is usually arranged at substantially the transverse center of said furnace as indicated in Fig. 2.

Mounted above the doghouse 6, outwardly of and preferably abutting the upper back wall 7 of the furnace, is a covering 11 which preferably consists of a metal hood member open at its lower end and provided at its upper end with an exhaust stack 12. The outer wall 13 of the hood 11 is provided with an opening 14 and inserted therethrough is an inclined chute 15 through which the batch ingredients are introduced into the doghouse 6. The front wall 13 of the hood is also spaced at its lower end above the doghouse, as indicated at 16, to provide an air inlet opening, and hanging from the wall in front of said inlet opening is an open-work metal shield or curtain preferably made up of a series of metal chains 17. This chain heat shield is provided so that air can pass therethrough into the lower end of the hood, which air then circulates upwardly through said hood and out the exhaust stack 12.

The numeral 18 designates the charging floor level in front of the furnace and which is provided with a grating 19 adapted to supply air circulation from the ground floor through the chain heat shield 17 into the hood 11 as indicated by the arrows in Fig. 1. While such an arrangement is preferred, the use of the grating 19 is not essential.

In operation, the raw batch ingredients, after being properly mixed, are fed downwardly through the chute 15 into the doghouse 6 where they are received in a loose pile upon the body of molten glass 9. The batch is then delivered from the doghouse into the melting tank 5 by passing it beneath the upper back wall 7 of the furnace. As the batch ingredients are being supplied to the doghouse, a continuous upward circulation of air is set up in the hood 11, and this air, entering the hood adjacent the lower end thereof and passing upwardly and outwardly of the exhaust stack 12, will create a draft sufficient to carry away all or at least the major portion of the loose batch dust present, so that when the batch passes into the melting tank proper, it will be relatively free of such dust. The normal flow of air upwardly through the hood can be accelerated if desired by introducing additional air into the exhaust stack 12 through a pipe 20 associated with a suitable low pressure air system.

With such an arrangement, it will be apparent that the amount of loose batch dust which is permitted to pass into the melting tank proper will be reduced to a minimum, thereby resulting in a material decrease in the fluxing or deterioration of the tank itself as well as the clogging of the regenerator checkerworks. The elimination of any appreciable amount of loose dust in the melting tank tends to greatly lengthen the life of the furnace as well as increasing the efficiency thereof and its ease of operation.

It will be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for feeding batch to a glass furnace, the combination with a melting tank having an extension at one end thereof for initially receiving the batch ingredients and from which they pass into said tank, of a covering for said extension provided with an outlet, means for feeding batch into the said extension, and means for setting up a circulation of air in said covering to carry the loose dust from the batch away from the tank and through the outlet in said covering.

2. In apparatus for feeding batch to a glass furnace, the combination with a melting tank having an extension at one end thereof for initially receiving the batch ingredients and from which they pass into said tank, of a hood member mounted above said extension and having an outlet adjacent its upper end, means for feeding batch into the said extension, and means for creating an upward circulation of air through said hood member to carry the loose dust from the batch away from the tank and through the outlet in said hood member.

3. In apparatus for feeding batch to a glass furnace, the combination with a melting tank having an extension at one end thereof for initially receiving the batch ingredients and from which they pass into said tank, of a hood member mounted above said extension and having an air inlet adjacent its lower end and an air outlet at its upper end, and means for feeding batch into the said extension, the air entering the hood member through said inlet passing upwardly to said outlet and carrying with it the loose dust from the batch.

4. In apparatus for feeding batch to a glass furnace, the combination with a melting tank having an extension at one end thereof for initially receiving the batch ingredients and from which they pass into said tank, of a hood member mounted above said extension and having an air inlet adjacent its lower end and an air outlet at its upper end, means for feeding batch into the said extension, the air entering the hood member through said inlet passing upwardly to said outlet and carrying with it the loose dust from the batch, and means for accelerating the normal flow of air through said hood member.

5. In apparatus for feeding batch to a glass furnace, the combination with a melting tank having an extension at one end thereof for initially receiving the batch ingredients and from which they pass into said tank, of a hood member mounted above said extension and having an air inlet adjacent its lower end and an exhaust stack communicating with its upper end, means for feeding batch into the said extension, the circulation of air upwardly through the hood member from said inlet to said exhaust stack serving to carry away the loose dust from the batch, and means associated with said exhaust stack for accelerating the upward flow of air through the said hood member.

6. In apparatus for feeding batch to a glass furnace, the combination with a melting tank having an extension at one end thereof for initially receiving the batch ingredients and from which they pass into said tank, of a hood member mounted above said extension and having an air inlet adjacent its lower end and an air outlet at its upper end, means for feeding batch into the said extension, the air entering the hood member through said inlet passing upwardly to said outlet and carrying with it the loose dust from the batch, and an open-work metal shield arranged in front of said inlet.

7. In apparatus for feeding batch to a glass furnace, the combination with a melting tank having an extension at one end thereof for initially receiving the batch ingredients and from which they pass into said tank, of a hood member mounted above said extension and having an air inlet adjacent its lower end and an exhaust stack communicating with its upper end, means for feeding batch into the said extension, the circulation of air upwardly through the hood member from said inlet to said exhaust stack serving to carry away the loose dust from the batch, and a chain heat shield arranged in front of said inlet.

8. In apparatus for feeding batch to a glass furnace, the combination with a melting tank having an extension at one end thereof for initially receiving the batch ingredients and from which they pass into said tank, of a hood member mounted above said extension and having an air inlet adjacent its lower end and an exhaust stack communicating with its upper end, means for feeding batch into the said extension, the circulation of air upwardly through the hood member from said inlet to said exhaust stack serving to carry away the loose dust from the batch, means communicating with said exhaust stack for introducing additional air therein to accelerate the upward flow of air through the said hood member, and a plurality of chains hanging in front of said inlet to provide a heat shield.

9. In apparatus for feeding batch to a glass furnace, the combination with a melting tank having a reduced extension at one end open at the top thereof, said tank and extension containing molten glass and the said extension being also adapted to initially receive the glass batch ingredients and from which they pass into the said tank, of a hood member mounted above said extension and serving as a covering therefor, said hood member having an air inlet adjacent its lower end and an air outlet at its upper end, and means for feeding batch into said extension through one side wall of said hood member, the air entering the said hood member through said inlet passing upwardly to said outlet and carrying with it the loose dust from the batch.

BOYD H. WEEKLEY.